United States Patent [19]

Wright

[11] 4,132,912
[45] Jan. 2, 1979

[54] QUIET COOLING SYSTEM FOR DYNAMOELECTRIC MACHINES

[75] Inventor: Terry Wright, Lafayette, Ind.

[73] Assignee: Westinghouse Electric Corp., Pittsburgh, Pa.

[21] Appl. No.: 802,934

[22] Filed: Jun. 2, 1977

Related U.S. Application Data

[63] Continuation of Ser. No. 638,000, Dec. 5, 1975, abandoned.

[51] Int. Cl.² .............................................. H02K 9/06
[52] U.S. Cl. ........................................ 310/62; 310/63
[58] Field of Search ....................... 310/51, 65, 64, 57, 310/157, 60, 53, 62, 58, 63, 59; 417/367, 366; 181/33 K, 43

[56] References Cited

U.S. PATENT DOCUMENTS

| | | | |
|---|---|---|---|
| 1,681,914 | 8/1928 | Barr | 310/63 |
| 2,488,365 | 11/1949 | Abbott | 310/62 |
| 2,881,337 | 4/1957 | Wall | 310/57 |
| 2,886,721 | 5/1959 | Picozzi | 310/51 |
| 2,967,959 | 1/1961 | Waters | 310/63 |
| 3,025,799 | 3/1962 | Hallerback | 417/366 |
| 3,041,117 | 6/1962 | Ramsey | 310/63 |

*Primary Examiner*—R. Skudy
*Attorney, Agent, or Firm*—L. A. DePaul; Z. L. Dermer

[57] ABSTRACT

A dynamoelectric machine having a quiet cooling system. The system comprises at least twenty-five short chord axially mounted radial blades disposed on a conical hub which is disposed on the rotor of the dynamoelectric machine. The arrangement and number of blades are such that the coolant flow is increased while the pure tone noises are reduced thus increasing cooling and reducing subjective annoyance. A conical shroud encloses the conical hub defining therebetween a conical annulus whose total annular cross-sectional area does not expand to the point where turbulence and flow separation would occur. A bell-mouthed protective grilled inlet is disposed on the conical shroud for conducting a coolant, under the action of the rotating blades, through the bell-mouthed inlet and into the conical annulus. The bell-mouthed inlet and conical annulus together providing a streamlined path for quietly diffusing the coolant into the proximity of surfaces susceptible to heating.

7 Claims, 2 Drawing Figures

QUIET COOLING SYSTEM FOR DYNAMOELECTRIC MACHINES

This is a continuation of application Ser. No. 638,000 filed Dec. 5, 1975 now abandoned.

BACKGROUND OF THE INVENTION

This invention relates to a dynamoelectric machine having a quiet cooling system. A typical example of the state of the art in cooling systems for dynamoelectric machines prior to this invention is the cooling system for a totally enclosed fan cooled motor. That system comprises a motor having cooling fins axially disposed about its periphery, a rotor shaft extending beyond the body of the motor, blades disposed on a hub which is clamped to the extended portion of the rotor shaft, a casing which totally encloses the motor, and a protective grille attached to the motor casing. In these motors the air flow enters axially across a high resistance grille, abruptly turns ninety degrees, is forced radially into a large void region, again turns ninety degrees back to the axial direction, and exits the flow system through jets to the cooling fins. The high resistance grille and the two ninety degree turns cause turbulence which causes pressure loss which reduces the coolant flow rate resulting in lower cooling effectiveness. Similarly, the large void regions at the exit of the blower permit recirculation, turbulence, and flow separation which likewise reduce the cooling effectiveness of the system. In addition, because a direct relation exists between the turbulence, flow separation, and sound pressure levels; turbulence or flow separation result in a noisier machine.

Also characteristic of the prior art fans is their low number of blades. In the prior art, the turbulence and flow separation not only cause high noise levels, but the low blade number produces a harsher noise which is audibly noticeable and contributes to greater subjective annoyance.

In U.S. Pat. No. 3,025,799, to S. L. Hallerback, issued Mar. 20, 1962, which does not deal specifically with noise treatment, there is described an immersible drainage pump. In the Hallerback patent the flow enters radially (with respect to the rotor axis) through a strainer and proceeds into a large void region where turbulence and recirculation occur. The flow must then turn ninety degrees into the blades of the pump. From there the flow is conducted through a substantially radial contour from which the flow must make a sharp turn to exit in an axial direction. The concave curvature of the hub provides for a substantially radial flow. The large void regions, the sharp turns, and the blunt hub nose all contribute to turbulence which causes noise. The Hallerback patent describes neither the number nor type of blades used.

In U.S. Pat. No. 2,886,721 to V. J. Picozzi et al, issued May 12, 1959, there is described an acoustically treated motor for reducing the overall noise level and quality of noise emanating from the machine during operation. The Picozzi invention primarily involves mounting a dissipative type muffler on a motor consisting of a plurality of sound insulated plenum chambers being located in a path followed by circulating air used in ventillating the machine. The tortuous ventillating path of the Picozzi patent is specifically designed so that there is no direct path for noises generated in the machine to escape to the atmosphere. As Picozzi states, fans produce two distinct kinds of aerodynamic noises, one of which, broad band noise, contains all frequencies arbitrarily distributed throughout the noise spectrum. The other kind is the discrete or pure tone noise which is individual noise of a single frequency. The broad band noise being miscellaneous and random, is not as annoying to the listener as the pure tone noise. On the other hand, pure tone noise creates greater subjective annoyance because most of the sound energy is concentrated into a single tone at a relatively high frequency. Picozzi proposed increasing the blade number from four to as many as twenty-one or twenty-three. His objective was to increase the pure tone frequency the amplitude of which is then easier to muffle. Increasing the frequency actually increases the subjective annoyance; however, Picozzi proposed to muffle these noises. The Picozzi patent does not teach a method of eliminating pure tone noises other than by muffling them.

U.S. Pat. No. 2,881,337, to R. L. Wall, issued Apr. 7, 1959, is primarily concerned with acoustical treatment of motors by providing a sound absorbent device of the resonant type associated with the motor for attenuating frequencies of high decibel levels.

An example of a fan cooling system is the 364 frame size 60 horsepower totally enclosed fan cooled 4-pole motor manufactured by ASEA of Sweden. Although this fan system is conical in some respects, the open front face with internal blading does not provide the proper inlet air approach to the blade row which results in an increased noise level. Likewise, the relative position of the fan hub to the motor frame causes disruption of the flow of air from the hub rather than providing a controlled guidance into the cooling fin channels thereby increasing the noise level. Due to the low blade number (10), the ASEA fan noise spectrum is characterized by significant pure tone noise which is undesirable. In addition, the conical portion of the shroud does not provide a decreasing annulus height relative to the shroud, so that a proper rate of diffusion is not maintained.

SUMMARY OF THE INVENTION

A bell-mouthed inlet covered by a protective inlet grille provides a large flow area for the coolant flow passing through the protective grille, and also acts to guide the coolant smoothly into the diffuser section. The diffuser section, a conical annulus, is defined on one side by a smoothly contoured fan hub having an extended skirt disposed on the rotor of the dynamoelectric machine. The other side of the diffuser section is a contoured shroud which encloses the fan hub. The conical annulus is formed such that its total annular cross-sectional area slowly enlarges providing a reasonable rate of diffusion yet remains below the point where turbulence and flow separation would occur. The fan hub has disposed thereon, at least twenty-five equally spaced short chord axially mounted radial blades of trapezoidal form that provide in conjunction with the inlet and diffuser a streamlined mixed flow path for the pressure generation of the cooling system. The arrangement and number of blades are such that the coolant flow is increased while the pure tone noises are reduced thus increasing cooling and reducing subjective annoyance. The shape of the blades also allows for a maximum throat cross-sectional area for a given minimum hub diameter thereby providing increased cooling and reduced noise. In addition, the blades are shaped to allow the entire fan hub to be fabricated in a single draw casting and to allow identical operational efficiency in either clockwise or counterclockwise rotation. The advantages of the invention are primarily aerodynamic in that large areas of recirculating flow are eliminated and the coolant proceeds smoothly from inlet grille to discharge area with no sudden turns required. The use of a large number of radial blades on contoured hub provides the system with maximum pressure and flow capability with minimum hub diameter, tip speed, and hence minimum noise generation without loss of cooling effectiveness.

DESCRIPTION OF THE PREFERRED EMBODIMENTS

Figure 2:
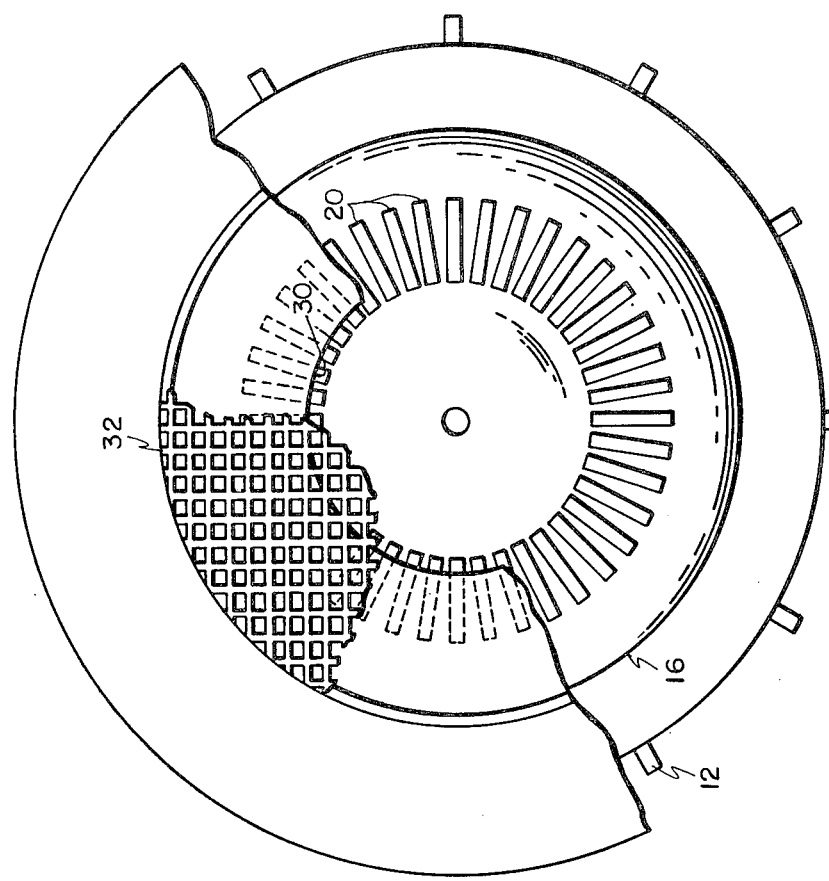
FIG. 2 is an end view of the invention with a portion of the grille removed.
Figure 1:
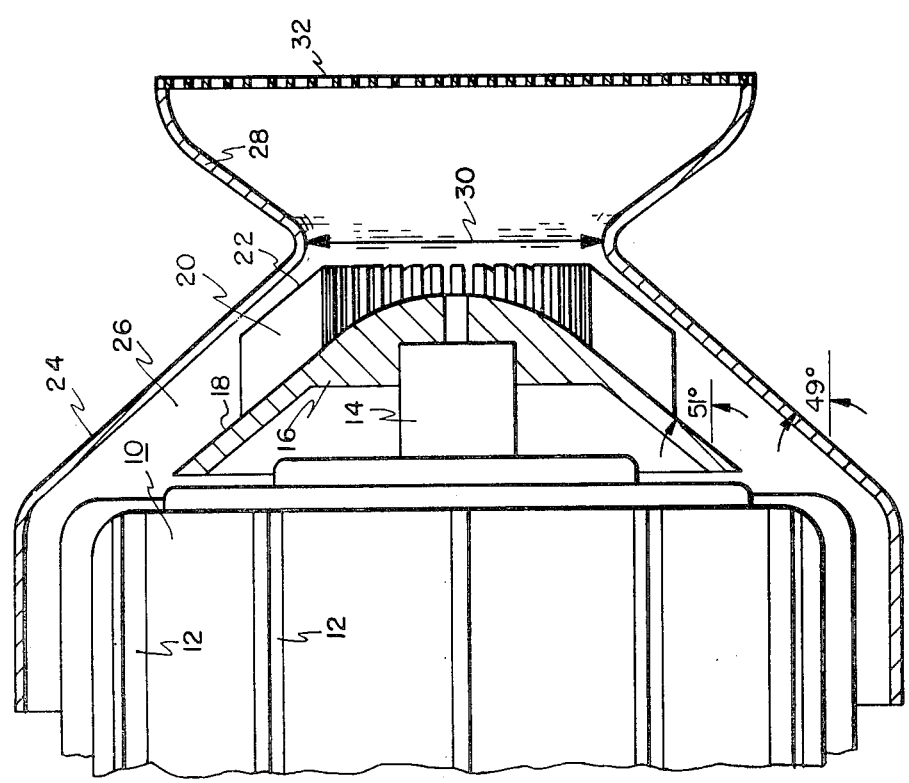
FIG. 1 is a sectional view of one embodiment of the present invention.

Referring to FIGS. 1 and 2, the preferred embodiment comprises a motor 10 having cooling fins 12 and a rotor 14. Attached to the rotor 14 is a conical hub 16 having a skirt 18 inclined at a fifty-one degree angle relative to the axis of rotor 14. Disposed on the conical hub 16 are forty short chord axially arranged radial blades 20 with blade tips 22. A conical shroud 24 inclined at a forty-nine degree angle relative to the axis of rotor 14 encloses the conical hub 16 defining therebetween a conical annulus 26. A bell-mouthed inlet 28 cooperates with the conical shroud 24 forming at their juncture a minimum cross-section known as the throat 30. Disposed on the bell-mouthed inlet 28 is a protective cross-hatched inlet grille 32.

The coolant (normally air) is drawn through the inlet grille 32 under the action of the rotating rotor 14, hub 16, and blades 20. The bell-mouthed inlet 28 smoothly conducts the coolant from the inlet grille 32, through the throat 30, and into the conical annulus 26. The conical annulus then diffuses the coolant into the proximity of surfaces susceptible to heating, cooling fins 12, thus cooling the motor 10.

Turbulence, flow separation, and recirculation increase the sound pressure level of a machine which increase is audibly noticeable as an increase in noise. These factors also cause pressure losses which must be compensated for by an increase in fan power. The present invention through a streamlined concept reduces these factors which results in a quieter machine without loss of cooling effectiveness.

The streamlined concept of the present invention consists of a cross-hatched grille 32, a bell-mouthed inlet 28, and a tapered conical annulus 26 in conjunction with short chord axially mounted radial blades 20. The cross-hatches grille 32 provides a low resistance protective cover which reduces turbulence and pressure losses thereby allowing for a smaller fan at the same cooling rate. From the inlet grille, the coolant proceeds smoothly through the large bell-mouthed inlet 28, through the throat 30, and into the conical annulus 26 eliminating turbulence at the inlet due to sharp turns and restricted passages. The conical annulus 26 then diffuses the coolant onto the cooling fins 12 thereby reducing turbulence and noise associated with high velocity flow. The distance between the conical hub 16 and the conical shroud 24 decreases from inlet to exit while the total annular cross-sectional area of the conical annulus 26 increases. The rate of total annular cross-sectional increase is such that the coolant is allowed to smoothly diffuse without turbulence or flow separation occurring which results in improved cooling at lower noise levels. The actual rate of cross-sectional increase, of course, depends on the size of the motor. The conical annulus also establishes a mixed flow path (i.e. a flow path which is neither radial nor axial with respect to the rotor axis). The use of a mixed flow path eliminates sharp bends and void regions, consequently reducing noise.

In order to prevent recirculation in the throat area thus further reducing noise, it is necessary to have approximately one-half of the blade tips 22 covered by the conical shroud 24. Covering one-half of the blade tip reduces the throat size which, therefore, reduces the coolant flow rate and resultant cooling. The throat area can be increased by increasing the hub diameter but that increases flow velocity which greatly increases noise. However, by the use of short chord axially mounted radial blades, the tip can be properly covered while the throat area remains at a maximum for a given minimum hub diameter thereby providing decreased noise while maintaining cooling. In addition, the blades are shaped to allow the entire fan hub to be fabricated in a single draw casting and to allow identical operational efficiency in either clockwise or counterclockwise rotation.

The invention further consists of the use of a large number of blades ranging from at least twenty-five to more than forty blades. Although forty blades may be a practical limit for economical fabrication, under appropriate circumstances blade numbers may exceed forty. Blade numbers in excess of fifty or sixty may be used where the economics and cooling effects would warrant it. The use of such a large number of blades causes the pure tone noise to be submerged in the broad band which greatly reduces the subjective annoyance. This elimination of the pure tone noises is accomplished by the use of this large number of blades without the use of mufflers. Empirical data has shown that with the use of twenty blades there is a perceptible pure tone noise, that with thirty blades the pure tone noise begins to be submerged in the broad band, and that with forty blades the pure tone noise is eliminated.

Experiments were carried out using the invention without a bell-mouthed inlet on a Westinghouse Standard-Line Life-Line T Medium A.C. motor, the 326-TS. This motor is a two-pole three-phase type producing fifty horsepower at 3600 rpm.

A comparison of the results of a test of the motor without the invention with results using a forty bladed version of the invention without the bell-mouthed inlet showed a decrease of 10 dBA with the same cooling rate, or a ten percent increase in cooling with a 7 dBA reduction in noise. In addition, the invention provided less subjective annoyance by eliminating pure tone noises. The addition of the bell-mouthed inlet would enhance these favorable results.

While there is described what is now considered to be the preferred embodiment of the invention, it is, of course, understood that various other modifications may be made therein; and it is intended to claim all such modifications as fall within the true spirit and scope of the present invention. For instance, as an alternative to the present embodiment, the cross-hatched grille may be replaced by another type of grille. In addition, it can be seen that more than one inlet of the type hereinabove described may be used.

What is claimed is:

1. A dynamoelectric machine having a quiet cooling system comprising:
- a rotor;
- a conical hub disposed on said rotor;
- a plurality of short chord axially disposed radial blades disposed on said conical hub for driving a coolant upon rotation of said rotor;
- a truncated conical shroud enclosing said conical hub and defining a diverging conical annulus therebetween, the distance at the inlet between said truncated conical shroud and said conical hub being greater than at the outlet with the total annular cross-sectional area being greater at the outlet than at the inlet; and
- said blades having blade tips substantially facing said inlet with said truncated conical shroud covering approximately one half of said blade tips while defining a substantially uniform clearance therebetween, said truncated conical shroud accepting said coolant for quietly diffusing through said diverging conical annulus into the proximity of surfaces susceptible to heating.

2. A dynamoelectric machine in accordance with claim 1 further comprising:
- a converging bell-mouthed inlet cooperating with said truncated conical shroud for smoothly conducting said coolant into said truncated conical shroud.

3. A dynamoelectric machine in accordance with claim 2 wherein:
- said truncated conical shroud and said converging bell-mouthed inlet form at their juncture a throat of minimum cross-sectional diameter, and
- said blades are entirely located within said shroud axially displaced from said throat.

4. A dynamoelectric machine in accordance with claim 1 wherein:
- said conical hub has an outer surface on which said blades are disposed that slopes at a single angle over the blade supporting portion, said hub surface also having a convex and smoothly rounded center portion.

5. A dynamoelectric machine in accordance with claim 1 wherein:
- said blades number at least twenty-five.

6. A dynamoelectric machine in accordance with claim 5 wherein:
- said blades number about thirty to about forty.

7. A dynamoelectric machine in accordance with claim 2 further comprising:
- a cross-hatched inlet grille mounted on said converging bell-mouthed inlet;
- said truncated conical shroud and said converging bell-mouthed inlet form at their juncture a throat of minimum cross-sectional diameter;

said blades are entirely located within said shroud axially displaced from said throat;
- said conical hub has an outer surface on which said blades are disposed that slopes at a single angle over the blade supporting portion, said hub surface also having a convex and smoothly rounded center portion; and said blades number at least twenty-five.

* * * * *